US007230582B1

(12) United States Patent
Dove et al.

(10) Patent No.: US 7,230,582 B1
(45) Date of Patent: *Jun. 12, 2007

(54) WEARABLE COMPUTER IN A PROCESS CONTROL ENVIRONMENT

(75) Inventors: Andrew P. Dove, Austin, TX (US); Kent A. Burr, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/249,597

(22) Filed: Feb. 12, 1999

(51) Int. Cl.
*G09G 5/00* (2006.01)
(52) U.S. Cl. .......................... 345/2.1; 345/7; 709/217
(58) Field of Classification Search ................ 345/7–9, 345/1.1–1.3, 2.1, 2.3, 3.1–3.4; 348/51–53, 348/115; 709/200, 204, 217–219, 224, 250
See application file for complete search history.

(56) References Cited

U.S. PATENT DOCUMENTS

| | | |
|---|---|---|
| 4,916,441 A | 4/1990 | Gombrich |
| 5,142,550 A | 8/1992 | Tymes |
| 5,252,967 A | 10/1993 | Brennan et al. |
| 5,307,297 A | 4/1994 | Iguchi et al. |
| 5,320,538 A | 6/1994 | Baum |
| 5,400,246 A | 3/1995 | Wilson et al. |
| 5,598,572 A | 1/1997 | Tanikoshi et al. |
| 5,647,019 A * | 7/1997 | Iino et al. ................... 382/154 |
| 5,666,530 A | 9/1997 | Clark et al. |
| 5,682,476 A | 10/1997 | Tapperson et al. |

(Continued)

FOREIGN PATENT DOCUMENTS

| | | |
|---|---|---|
| AU | 239534 | 11/1993 |
| EP | 0 670 537 A1 | 9/1995 |
| GB | 2 346 720 A | 8/2000 |
| NZ | 216109 | 8/1989 |
| NZ | 227231 | 1/1991 |
| WO | WO 00/02344 | 1/2000 |

OTHER PUBLICATIONS

Bauer, et al. "A Collaborative Wearable System with Remote Sensing," *IEEE paper, presented at International Symposium on Wearable Computers*, Pittsburgh, Pennsylvania, pp. 10-17, (Oct. 1998).

(Continued)

*Primary Examiner*—Regina Liang
(74) *Attorney, Agent, or Firm*—Marshall, Gerstein & Borun LLP.

(57) ABSTRACT

A wearable computer for use in a process control environment includes a central processing unit, a memory and a number of peripheral devices such as a heads up display, a microphone, a video camera and a remote communication device that communicates with a host computer. The wearable computer provides information pertaining to one or more devices within a process control system (such as diagnostic information, help information, operator overviews, schematics or process parameter information) via the heads up display. The wearable computer also executes a routine that processes the video camera image to automatically identify process control devices within the field of view of the wearer based on device features such as device tags, a routine that enables a wearer to verify the proper connection of devices and/or communication channels within a process control system, a routine that displays a common image on both the heads up display and an operator workstation display and a routine that stores and automatically retrieves voice messages pertaining to any device within the process control system.

48 Claims, 8 Drawing Sheets

U.S. PATENT DOCUMENTS

| | | | | |
|---|---|---|---|---|
| 5,815,126 | A | * | 9/1998 | Fan et al. ............... 345/8 |
| 5,838,595 | A | | 11/1998 | Sullivan et al. |
| 5,844,824 | A | | 12/1998 | Newman et al. |
| 6,085,135 | A | | 7/2000 | Steckel |
| 6,108,197 | A | | 8/2000 | Janik |
| 6,129,449 | A | | 10/2000 | McCain et al. |
| 6,172,657 | B1 | | 1/2001 | Kamakura et al. |
| 6,226,401 | B1 | * | 5/2001 | Yamafuji et al. ........ 382/165 |
| 6,266,612 | B1 | | 7/2001 | Dussell et al. |
| 6,457,024 | B1 | | 9/2002 | Felsentein et al. |
| 6,574,672 | B1 | | 6/2003 | Mitchell et al. |
| 6,806,847 | B2 | | 10/2004 | Nixon et al. |
| 2002/0114525 | A1 | | 8/2002 | Bolle et al. |
| 2002/0171558 | A1 | | 11/2002 | Bartelheim et al. |
| 2003/0204373 | A1 | | 10/2003 | Zielinski et al. |
| 2003/0229472 | A1 | | 12/2003 | Kantzes et al. |
| 2004/0034448 | A1 | | 2/2004 | Siegers |

OTHER PUBLICATIONS

Rekimoto, et al. "Augment-able Reality: Situated Communication Through Physical and Digital Spaces," *IEEE paper, presented at International Symposium on Wearable Computers*, Pittsburgh, Pennsylvania, pp. 68-75, (Oct. 1998).

"Hats On For Process Control," *Control*, p. 28 (Nov. 1997).

Search Report for Application No. GB 0220734.8 conducted Mar. 19, 2003.

Notice of the Reason of Rejection for Patent Application No. 2000-033421 dated Sep. 3, 2003.

Patent Abstracts of Japan for Application No. 04-265405 filed Sep. 8, 1992.

Patent Abstracts of Japan for Application No. 08-134984 filed May 29, 1996.

Patent Abstracts of Japan for Application No. 08-272582 filed Oct. 15, 1996.

Examination Report under Section 18(3) issued in GB 0220734.8 on Sep. 27, 20004 by the British Patent Office.

United Kingdom Search Report for Application No. GB0525104.6 dated May 10, 2006.

Examination Report under section 18(3), United Kingdom Application No. 0220734.8, dated Jul. 15, 2005.

Combined Search and Examination Report under Sections 17 and 18(3) issued in GB 0412799.9 application by United Kingdom Patent Office on Oct. 13, 2004.

Patent Abstract of Japan, Sep. 19, 1997, JP 09247180 A (Tokyo Shibaura Electric Co.).

* cited by examiner

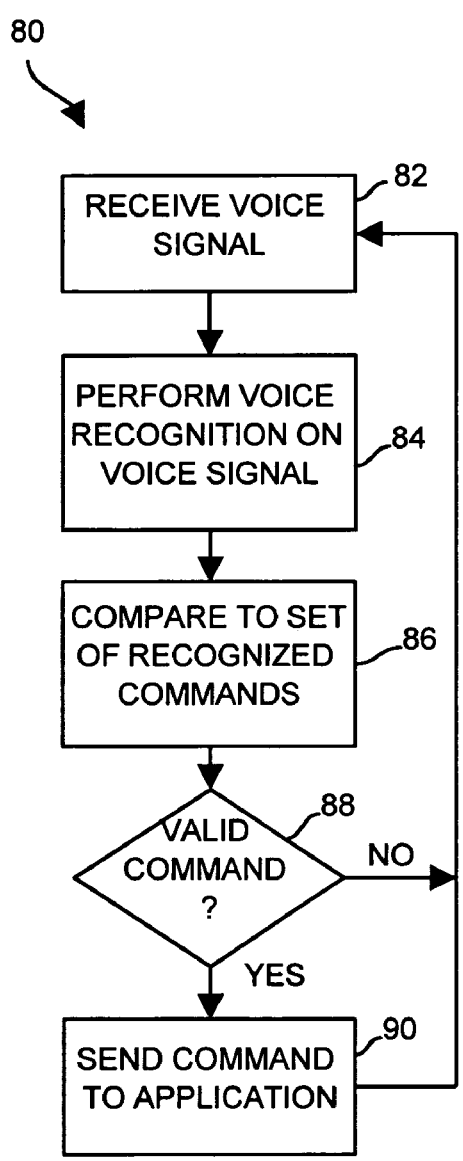
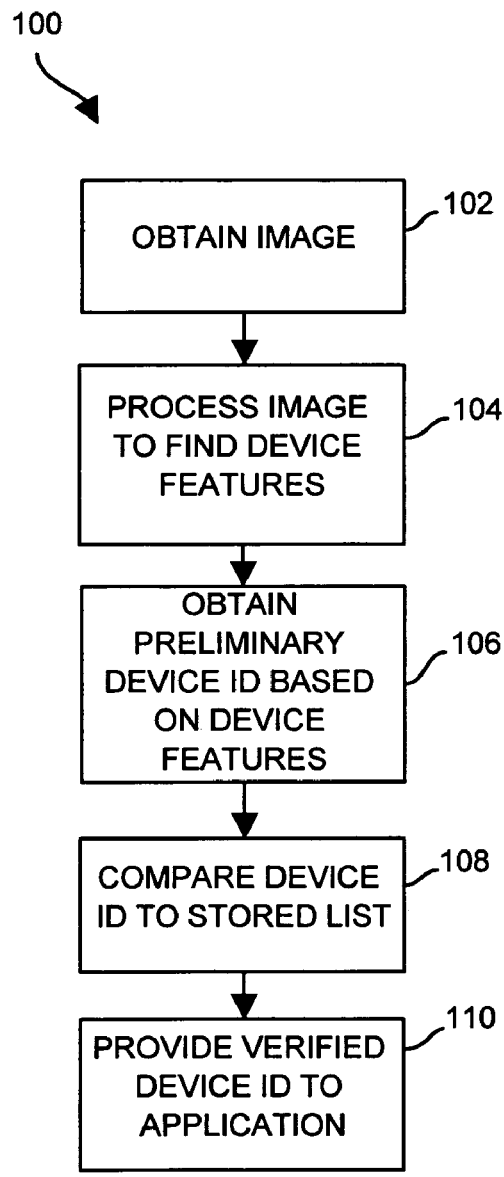
FIG. 3
FIG. 4

WEARABLE COMPUTER IN A PROCESS CONTROL ENVIRONMENT

FIELD OF THE INVENTION

The present invention relates generally to process control systems and, more particularly, to the use of a wearable computer to provide enhanced support within a process control environment.

DESCRIPTION OF THE RELATED ART

Process control systems, like those used in chemical, petroleum or other processes, generally include a centralized process controller that is communicatively coupled to at least one host or operator workstation and to one or more field devices via analog, digital or combined analog/digital buses. The field devices, which may be, for example valves, valve positioners, switches, sensors (e.g., temperature, pressure and flow rate sensors), etc., perform control functions within the process such as opening or closing valves and taking measurements of process parameters. Generally speaking, the process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications that are executed by the operator workstation to enable an operator to perform any desired function with respect to the process, such as viewing the current state of the process, modifying the operation of the process, etc.

While an operator or a technician can access a variety of types of information pertaining to the process control system and the individual devices therein (such as help, diagnostic, set-up and configuration information) using the host workstation, there are many process control activities that require a technician to go out into the actual plant environment where no host workstation is present. Such activities include, for example, visually inspecting a process control device or area, connecting devices or buses within the process control environment, taking manual measurements, repairing and replacing field devices, etc. In these cases, the operator or technician may carry manuals pertaining to the function to be performed out into the plant and look up any needed information in the field. This process can be very cumbersome. More likely, the technician will return to the operator workstation one or more times to look up any information he or she may need during the course of the performing the desired activity, which is very time consuming and is prone to error. Other times, the technician will carry a radio or walkie-talkie into the plant and communicate via the radio with an operator located at the operator workstation to get any needed information. However, the amount of information that can be provided over the radio is limited and, again, is prone to errors because it is based on human communications. Furthermore, because the technician typically carries and operates the radio using his or her hands, the use of a radio makes performing certain functions, like repairing a device, much more cumbersome and difficult.

With the advent of smaller electronics, portable computers in the form of wearable computers have become more readily available. A wearable computer generally includes a standard central processing unit (CPU) and a memory packaged in a small container and placed within a pouch on a belt or harness worn by a user (also referred to herein as a "wearer"). Batteries for powering the wearable computer are typically located in a different pouch within the harness, which is designed to make carrying the wearable computer as convenient as possible. Peripheral devices, such as disk drives, hard drives, PCMCIA slots, microphones, bar code readers and keyboard devices may be communicatively coupled to the CPU via appropriate wires or buses and, if desired, one or more of these peripheral devices may be placed in or connected to the harness. It has also been suggested to provide a heads up display (HUD) worn by the wearable computer user to present the wearer with a visual interface. A wearable computer thereby provides portable computing power and memory to a user and, because the wearable computer is worn instead of carried by the user, the user's hands are only required to manipulate a keyboard or other input device.

While it has been previously suggested to use wearable computers in environments such as office environments, it is not believed that a wearable computer has been incorporated in and used in a process control system to enhance the abilities of an operator or a technician to identify devices and to perform other functions within a process control environment. Also, most wearable computers require the use of some sort of hand-manipulated input device, such as a keyboard or a twiddler. While these devices are typically ergonomically designed to be as least cumbersome as possible, these devices still require the use of a the wearer's hands to input information or data. In a process control environment however, a technician typically needs to have both hands free in order to perform complex operations, such as calibrating and repairing devices, connecting devices within the process control system, etc.

SUMMARY OF THE INVENTION

A wearable computer for use in a process control environment includes a central processing unit and a memory connected to one or more peripheral devices including, for example, a heads up display, a microphone, an imaging device (such as a video camera) and a remote communication device (such as a wireless ethernet transceiver) that communicates with a host computer of a process control system. The wearable computer may provide information pertaining to one or more devices within the process control system via the heads up display. The information which can be, for example, diagnostic information, help, operator overviews, schematics or process parameter information, may be stored in the memory of the wearable computer or may be obtained from the host computer via the remote communication device.

The wearable computer may include a software routine or a software/hardware device that processes an image developed by the imaging device to automatically identify process control devices within the field of view of the wearer based on device features. This processing, which can performed on the basis of device tags required to be placed on devices within process control environments, automatically identifies one or more process control devices without requiring the user to input any information via a hand manipulatable device and may be used to provide the wearer with information pertaining to the identified devices, including process parameter values developed by the identified devices.

Still further, the wearable computer can be used to test the proper connection of devices and/or communication channels within the process control system. In this embodiment, a software routine run on the wearable computer displays information to the wearer via the HUD including, for example, a list of devices or communication channels, and allows the wearer to select an appropriate device and/or communication channel to be tested. The wearer may choose a device or channel using verbal commands decoded by a voice recognition routine run on the wearable computer or using commands entered via any other input device. After the appropriate I/O channel has been chosen, the routine obtains the current value of the signal on the selected channel via remote communications with the host computer and displays this value to the wearer on the HUD. At this point, the wearer can manually test the value on the actual communication channel using, for example, a hand-held measurement device. The routine then allows the wearer to change the value of the channel by inputting a new value using, for example, voice commands. Next, the routine communicates the new value to the host computer, which changes that value within the process control system and communicates the change back to the wearable computer. The change may be displayed to the wearer via the HUD, at which point the wearer may again manually measure the signal on the channel to see if the measured signal has changed to the new value. If not, a problem exists within the process control system configuration. Using this system, the wearer can test the connections within a process control environment in a hands free manner and without having to communicate changes to be made to another person located at a different part of the plant (e.g., at an operator workstation).

In another embodiment, routines run on the wearable computer and a host workstation enable the wearer and an operator at the host workstation to view and manipulate a common image to thereby enhance communications between the operator and the wearer. The host system may receive a video signal developed by the video camera of the wearable computer and may select a base image for shared viewing. This image is displayed on the host display and is sent to the wearable computer to be displayed on the HUD. Thereafter, one or both of the operator and the wearer may manipulate the image by, for example, moving a cursor within the image, highlighting, placing data or information on the image, etc. and such changes are sent to the other system so as to be displayed on both the host display and the HUD.

In a still further embodiment, the wearable computer may be used to create and store information, for example, in the form of voice messages, pertaining to any device or other object within the process control environment. Such information may then be automatically supplied to any wearer or operator who later passes by the device.

BRIEF DESCRIPTION OF THE DRAWINGS

FIG. 3 is a flow chart diagram of a software routine that processes voice data to recognize commands in the wearable computer system of FIG. 2;

FIG. 4 is a flow chart diagram of a software routine that automatically recognizes process control devices based on video information collected by the wearable computer system of FIG. 2;

DESCRIPTION OF THE PREFERRED EMBODIMENTS

Figure 1:
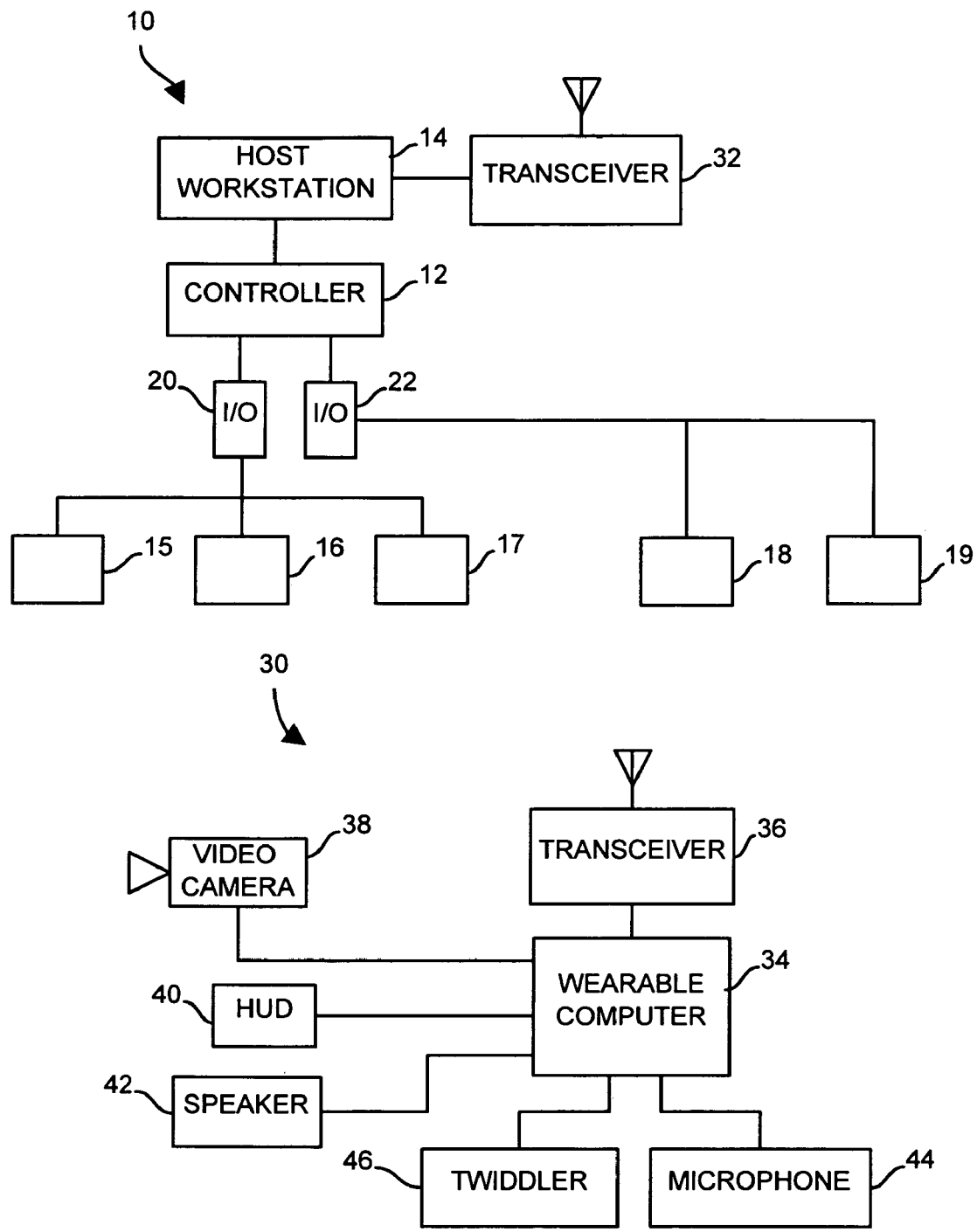
FIG. 1 is a schematic block diagram of a process control network having a wearable computer system remotely coupled thereto.

Referring now to FIG. 1, a process control system 10 includes a process controller 12 connected to a host workstation or computer 14 (which may be any type of personal computer or workstation) and to field devices 15, 16, 17, 18 and 19 via input/output (I/O) cards 20 and 22. The controller 12, which can be by way of example, the DeltaV™ controller sold by Fisher-Rosemount Systems, Inc., may be communicatively connected to the host computer 14 via, for example, an ethernet connection and may be communicatively connected to the field devices 15–19 using hardware and software associated with any desired communication protocol, such as the FOUNDATION™ Fieldbus, the HART®, PROFIBUS®, WORLDFIP®, Device-Net® CAN protocols, to name a few. As is typical, the controller 12 implements a process control routine stored therein and communicates with the devices 15–22 and the host computer 14 to control a process in any desired manner. The field devices 15–19 may be any type of devices, such as sensors, valves, transmitters, positioners, etc. while the I/O cards 20 and 22 may be any types of I/O devices conforming to any desired communication or controller protocol.

As illustrated in FIG. 1, the host computer 14 is communicatively coupled to a wearable computer system 30 through a remote or wireless communication device, such as a remote ethernet transceiver 32. Alternatively, the host computer 14 may be coupled to the wearable computer system 30 via a physical line or bus having terminals located throughout the process control environment to which the wearable computer system 30 can be temporarily connected and disconnected.

The wearable computer system 30 includes a wearable computer 34 having a remote transceiver 36 and a number of peripheral devices attached thereto. In the preferred embodiment, the wearable computer 34 includes a Pentium class CPU mother board with video, sound, RAM (e.g., 64 Mb) and ROM with a hard drive (e.g., 4.3 Gb), all located within a wearable computer harness (not shown). The wearable computer 34 may include any number of slots, such as PCMCIA slots, one of which can be used to receive the remote transceiver 36 and another of which may be used to receive a video processing board such as a video frame capture board. The peripherals communicatively coupled to the wearable computer 34 include an imaging device 38, which may be a video camera, a HUD 40, a speaker 42 (which may be a headphone speaker or any other type of speaker), a microphone 44 and a user input device 46 which may be for example, a typical keyboard, a mouse, a track ball, or a twiddler device having a limited number of easy to use keys (such as function keys), the function of which is defined differently for different applications. Of course, any other peripheral devices may be used in addition or in the alternative.

While the imaging device 38 is preferably a video camera, it may instead be any other type of imaging device, such as a digital camera, that is compact and easily transported by the wearer in a hands-free manner. Most preferably, the video camera 38 or other imaging device is mounted on the HUD 40 or on some other device (such as wearable headgear) which points in the direction that the wearer is looking. One small and easily mounted video camera that can be used for this purpose is sold by the Pulnix corporation. This video camera conforms to the high definition television (HDTV) standard (i.e., produces an 800 by 600 color pixel image frame), has about one quarter of an inch to one half of an inch diameter lens and produces a high resolution color image. However, other video cameras can be used instead including, for example, video cameras that produce high or low definition color or black and white (i.e., gray-scale) images. In some instances, a low definition video camera (either color or black and white) may be preferable to speed up the time needed to process an image in the manner described below.

The HUD 40 may use an NTSC video format and is preferably a monocular HUD such as the M1 HUD sold by Liquide Image Corp. located in Canada. This HUD provides a quarter VGA (i.e., 320 by 240 pixel) gray-scale image. Of course, HDTV format HUDs (which are currently prohibitively expensive) or other color or gray-scale HUDs, either those available now or those developed in the future, could be used instead. The speaker 42, the microphone 44 and the input device 46 can be any suitable and easily transportable devices preferably mounted with respect to the wearer in a hands-free manner. In one embodiment, a bone microphone may operate as both the microphone 44 and the speaker 42. As is known, bone microphones use the bones within the wearer's jaw to detect voice signals and/or to produce sound signals at the wearer's ear.

With the wearable computer system 30 installed, the wearer still has both hands free to perform other activities, such as repairing devices, taking measurements or holding other instruments. Of course, the input device 46 may require one or both hands to operate, but is still preferably mounted in a hands-free manner with respect to the wearer.

Figure 2:
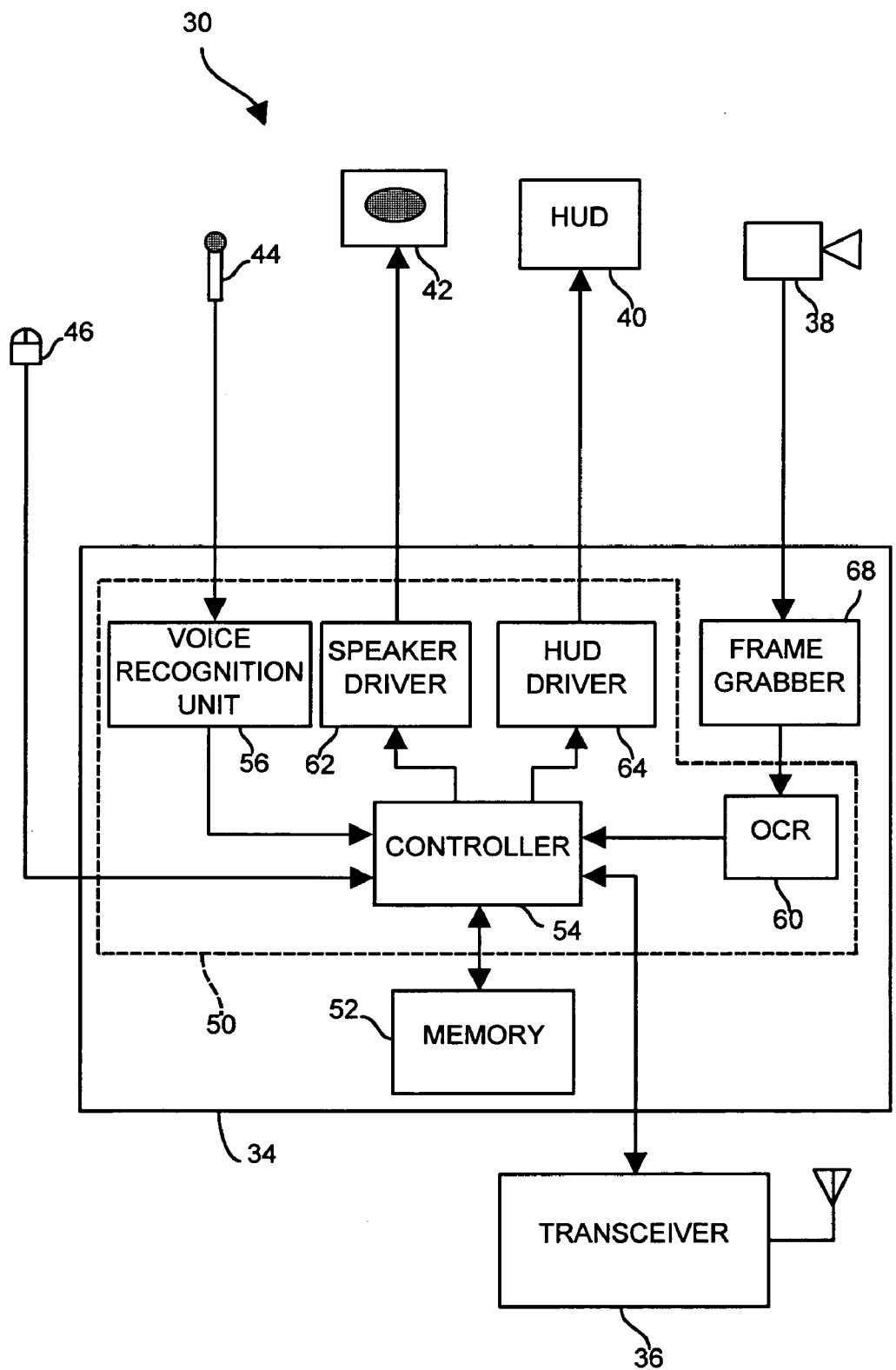
FIG. 2 is a schematic block diagram of the wearable computer system of FIG. 1.

Referring now to FIG. 2, the wearable computer 34 includes a CPU 50 coupled to a memory 52, which may be any type of memory including, for example, a disk drive (such as a hard, magnetic or laser disk storage device), RAM, ROM, EEPROM, EPROM, etc. The CPU 50, which can include one or any multiple number of processor units (or other hardwired or firmware elements) operating independently or in a coordinated manner, executes one or more software applications (stored in the memory 52) using any of the inputs to the wearable computer 34, information stored in the memory 52 and/or information provided from the host system via the transceiver 36. The CPU 50 also provides outputs to the peripheral devices, as well as to the host system via the remote communication device, i.e., the transceiver 36. In the embodiment of FIG. 2, the CPU 50 is illustrated as including a controller 54 which (may be implemented in hardware or software) and which executes the operating system associated with the wearable computer 34 to recognize different inputs from the peripheral devices and other components of the wearable computer 34 and to execute one or more applications. The CPU 50 illustrated in FIG. 2 includes or executes a voice recognition unit 56, an optical character recognition (OCR) unit 60, a speaker driver 62 and a HUD driver 64. Furthermore, the CPU 50 is coupled to a video frame grabber 68 which may be provided on a separate video processing board.

The voice recognition unit 56 which may be, for example, the Dragon Dictate system sold by Dragon Systems of Boston, Mass., or any other desired voice recognition unit, is typically implemented in software but may, alternatively, be executed on a separate processor board. In any event, the voice recognition unit 56 receives speech, voice or other sound signals from the microphone 44, performs voice recognition processing thereon and delivers commands to the controller 54 based on recognized voice inputs. The voice recognition unit 56 may perform any desired or known processing on the received voice signals to identify certain recognized speech commands or words. During this process, the voice recognition unit 56 may compare an identified voice command to a list of stored or recognized speech commands (stored in, for example, the memory 52) to determine if a valid command is being delivered by the wearer. If a recognized command has been received, the voice recognition unit 56 delivers the command to the controller 54 for further processing. Of course, if desired, the controller 54 may determine if a voice command is a valid or recognized command within the context of the application being run on the controller 54 and may notify the user when an unrecognized command is received. The voice recognition unit 56 may also have learning capabilities, as is known.

FIG. 3 illustrates a block diagram of a software routine 80 that processes a voice signal to identify voice commands and which may be executed by the wearable computer system 30 to enable the wearer to enter data or commands verbally and, therefore, in a hands-free manner. A block 82 of the routine 80 receives a voice signal from the microphone 44. A block 84 processes the voice signal to identify a voice command within the signal using any desired or standard voice recognition processing routine, such as that indicated above. A block 86 then compares the identified command or input with a set of commands stored in, for example, the memory 52, to determine if the command is valid. If a block 68 determines that the voice command is recognized, a block 90 provides the command to the controller 54 to be used by whatever application is expecting such command. Thereafter, or if the voice command signal is not recognized as a valid command at the block 88, control is returned to the block 82 which receives and processes further voice signals. Of course, if an invalid command has been received, the routine 80 may display an indication of such to the wearer.

The video processing unit provided within the wearable computer 34 of FIG. 2 includes the frame grabber 68 coupled to the OCR unit 60 but could include other video or image processing hardware/software as well. The frame grabber 68 may be, for example, a Nogatek board sold by the Nogatek Company, while the OCR unit 60 may be, for example, the Carina real-time OCR package which is sold by Adaptive Recognition Hungary, located in Budapest, Hungary. While this particular OCR unit has previously been used to identify license plate numbers on vehicles, it is believed that this product or a derivative of this product (having only minor modifications thereto) would operate satisfactorily to recognize device features as described below. Of course, other suitable frame grabber boards and OCR packages could be used as well. As illustrated in FIG. 2, the frame grabber 68 receives an image signal (having multiple image frames therein) from the video camera 38 and provides an output frame to the OCR unit 60. (Of course, if the imaging device 38 produces a still image, such as that produced by a digital camera, the frame grabber 68 may be unnecessary.)

In one embodiment, the OCR unit 60 processes the received image to identify device features within the image, and these device features are then used to identify one or more devices within the field of view of the video camera 38. For example, the OCR unit 60 may look for and recognize predetermined symbols, such as alpha-numeric symbols located on field devices, and provide such recognized symbols to the controller 54 for device identification. Of course, if desired, the output of the video camera 38 may be used for other purposes. For example, the video image may be provided to the controller 54 to be displayed on the HUD 40 and/or may be sent to the host computer 14 via the transceiver 36 for viewing or and/or processing by the host computer 14.

Referring to FIG. 4, a routine 100 illustrated in flow chart form may be implemented in software executed by the wearable computer 34 to automatically recognize devices within the field of view of the wearer based on the video input collected by the imaging device 38. A block 102 obtains a video or other image from the imaging device 38. If the imaging device 38 is a video camera, the block 102 may use the frame grabber 68 to grab a particular video frame. However, if the imaging device is, for example, a digital camera, the block 102 may access the image directly without the aid of the frame grabber 68.

A block 104 then processes the obtained video image or frame to identify potential device features within the video frame. In one embodiment, the device feature is a device tag mandated to be placed on each of the field devices within a process control environment by OSHA. Usually, such device tags include a rectangular holder or frame (typically one to two inches high by three to four inches wide) having alpha-numeric characters etched or otherwise engraved or carved therein so as to be visible to persons within the process environment. The alpha-numeric characters are usually a different color than the frame to make these characters more visible. When recognizing device tags, the block 104 scans the image to identify areas likely to contain device tags, such as rectangular areas within the image, areas with certain ranges of colors, areas having alpha-numeric characters therein, etc. Of course any desired processing may be used to search for these device features. Thereafter, a block 106 recognizes or decodes the device features within the identified areas. In particular, when device tags are being identified, the block 106 may apply optical character recognition (using the OCR 60) on the identified features to produce a preliminary device ID. If more than one device is within the image being processed, the blocks 104 and 106 may recognize numerous device features (such as device tags) and identify numerous preliminary device IDs.

Next, a block 108 compares each of the preliminary device IDs to a list of device IDs stored in, for example, the memory 52 to verify the existence of devices corresponding to the preliminary device IDs. If corresponding devices exist, the device IDs are verified and each of the verified IDs is provided by a block 110 to the controller 54 for use in other applications, to be displayed to the wearer via the HUD 40 and/or to be sent to the host computer 14 via the transceiver 36.

While the routine 100 can identify devices based on any observable features, it is preferable that the routine 100 identify devices based on device features, i.e., features that are part of the device as it is placed in the field without regard to automatic detection and identification by the wearable computer system 30. In other words, while it would be possible to place bar codes or other unique identifiers on each of the devices within a process control environment, it is preferable to have the routine 100 identify devices based on features that are not placed on the device solely for the purpose of detection by the wearable computer system 30, i.e., features already existing on the device for other purposes. If detection and identification is performed using device features, then no additional steps need to be taken to label or otherwise mark each device within a process control environment for the specific purpose of being identified by a wearable computer.

Other applications which, for example, automatically display information to the wearer via the HUD 40 may display the identified devices to the wearer, may display other information pertaining to the identified device(s) to the wearer via the HUD and/or may send the identified device IDs to the host system 14. Of course, the list of recognized devices may be stored in the memory 52 of the wearable computer 34 or within a different memory, such as a memory within the host system 14 which can be accessed via remote communications by the block 108 to verify preliminary device IDS. As will be understood, it is not essential that each of the blocks of the routine 100 be executed within the wearable computer system 30. Instead, one or more of these blocks can be executed by the host computer 14, which can communicate with the wearable computer system 30 to perform the routine 100.

Referring again to FIG. 2, the speaker driver 62 takes signals provided by the controller 54 and processes them by, for example, converting them to standard analog audio signals, amplifying them, etc. The speaker driver 62 then provides the processed signal to the speaker 42. As will be readily understood, the speaker driver 62 and the controller 54 may be used to play prerecorded signals stored in, for example, the memory 52 or the memory of the host computer 14 and/or may be used to relay real-time audio produced by or at the host system, such as the voice of an operator located at the host system, or the voice of another wearable computer user located elsewhere within the process control environment. The voice or audio signals to be played on the speaker 42 may be provided to the wearable computer 34 via the transceiver 36 from the host system or may be provided using any other audio communication system coupled to the wearable computer 34.

Similarly, the HUD driver 64 receives signals from the controller 54 including graphics to be displayed on the HUD 40, and preforms appropriate processing on these signals for display via the HUD 40. In some embodiments, the HUD driver 64 and the HUD 40 may be used in conjunction with the twiddler 46 or microphone 44 to provide a standard computer operating environment, such as a Windows image having dialogue boxes, text, graphics and the like. With this environment, the wearer can move a cursor, enter information or manipulate the image on the HUD 40 to, for example, run an application or make decisions within the context of an application being executed by the wearable computer 34.

The controller 54 uses the transceiver 36 in any desired or standard manner, and provides signals to the transceiver 36 for communication to the host system using any desired communication protocol. Likewise, the controller 54 receives and decodes communications from the host computer 14 via the transceiver 36 using any desired communication protocol.

The wearable computer system 30 of FIG. 2 can be used to provide numerous kinds of information to the wearer and/or to perform functions within the process control environment which make the wearer's task easier and quicker when the wearer is, for example, inspecting, installing, repairing, calibrating and checking the connections of different devices within the process control environment. For example, using the wearable computer system 30, a wearer can obtain and view information pertaining to certain devices or areas within the process control environment via the HUD 40 either automatically or after appropriate input via one of the peripherals. The wearable computer 34 may store, or may communicate with the host computer 14 to obtain, any desired information pertaining to a particular device or to the process control system in general and display that information to the wearer via the HUD 40 at the request of the wearer or when the wearable computer system 30 recognizes a device within the field of view of the wearer as described above. The displayed information may include process information, such as schematics or operator overviews of the process control system, device information such as device lists, help information, diagnostic information and even process parameter information (such as measurements, parameter values, etc.) made by or associated with one of more of the devices connected within the process control system.

To view such information, the wearer can, when walking by a device, enter a device identifier, such as a device tag or a device number, which may cause the controller 54 to automatically display certain kinds of device information, such as help, calibration, diagnostics, parameter values, etc. Of course the wearer can enter the device identifier using the twiddler 46, the microphone 44 or any other input device. When using the microphone 44, the voice recognition unit 56 can identify, for example, a spoken device tag number or name and provide that device tag number or name to the controller 54. If desired, the voice recognition unit 56 can be set up to receive a device number, a device name or any other device identifier and compare the entered identifier to a list of valid device numbers or names within the memory 52.

In one embodiment, as described above, the devices within the field of view of the wearer are automatically detected by the video processing circuitry and, when such detection takes place, information about the device may be automatically displayed to the wearer via the HUD 40 in any desired format. If the information is stored in the memory 52, the information can be automatically accessed by the controller 54 and provided or displayed via the HUD 40 using the HUD driver 64. Alternatively, if the information is stored within the host system, the controller 54 may request and receive the appropriate information via the transceiver 36 and then display such information on the HUD 40. In the case of process parameters measured by or stored within a device, the host system may communicate with the device to obtain the most recent values or data before delivering that information to the wearable computer system 30.

In any of these cases, the controller 54 can display a list of recognized devices to a user and allow the user to choose to view information about any of the devices or, alternatively, the controller 54 can automatically display information about the recognized devices via the HUD 40. Significantly, the use of the microphone 44, the video camera 38 and the associated hardware/software on the wearable computer system 30 enables the wearer to receive and view information pertaining to devices (or areas or other units of the process control system) automatically in a hands-free manner, i.e., without having to enter any data or other information via a hand-held or hand manipulated device. This leaves the wearer's hands free to perform other tasks, such as repairing, replacing or calibrating a device, manipulating other tools, etc. which is very advantageous. Still further, the wearable computer system 30 can receive and display information measured by or stored within devices at which the wearer is actually looking, without the need for separate dials or displays being physically located on the outside of each device.

In another embodiment, the wearable computer system 30 can be used to provide a shared view (e.g., display) to an operator located at, for example, the host computer 14 and to the wearer via the HUD 40 to thereby enhance communications between the two. Such a shared view application displays the same image to both persons and allows one or both of these persons to manipulate the image to, for example, point out or highlight particular parts of the image or post data on the image. These actions can be used in conjunction with voice communications to thereby enhance conversations between the wearer and an operator located at the host computer 14.

Figure 5:
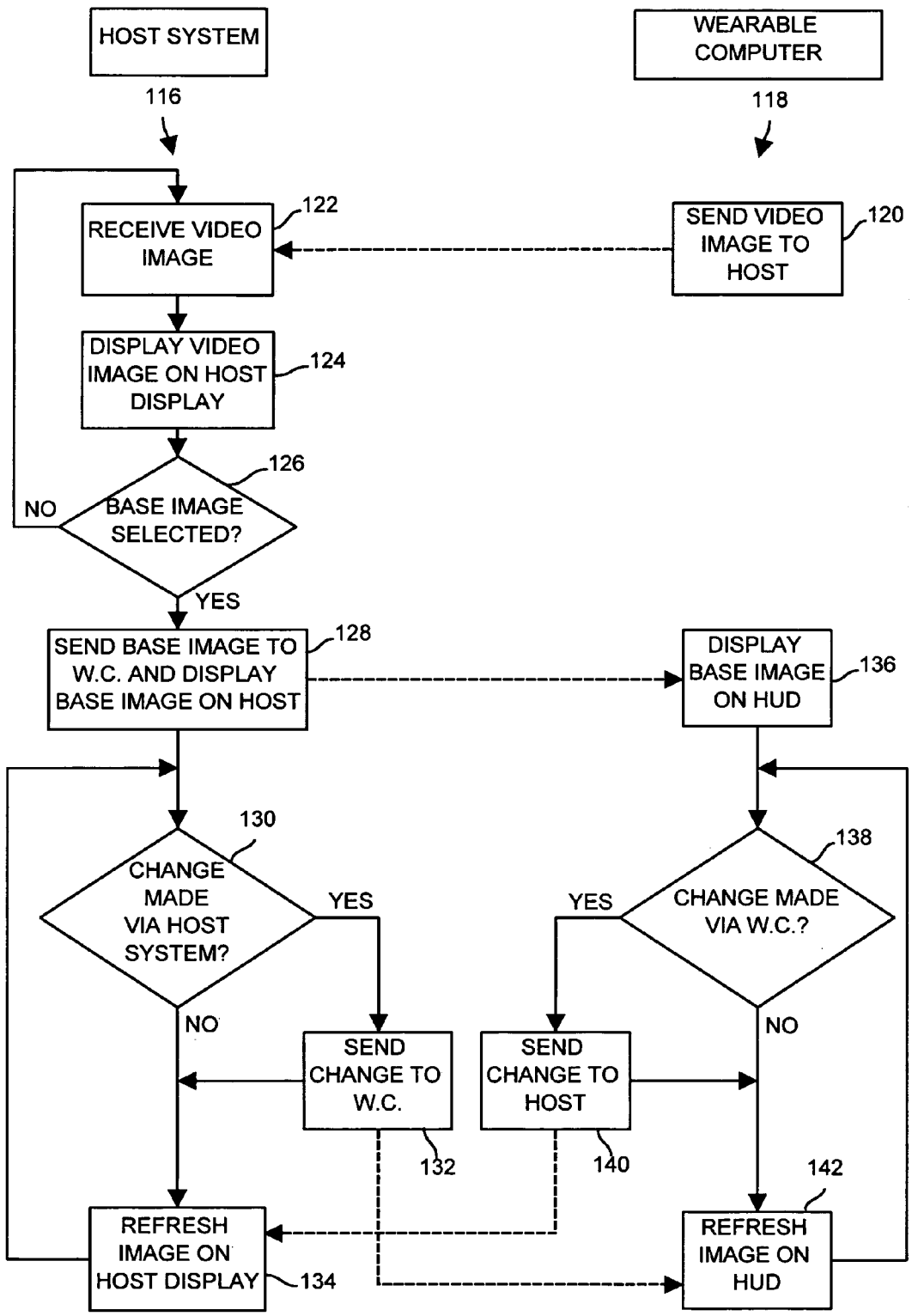
FIG. 5 is a flow chart diagram of a set of software routines that provide a shared image between a host system and the wearable computer system of FIG. 2.

FIG. 5 illustrates a block diagram of a software routine 116 that can be run on the host computer 14 and a block diagram of a software routine 118 that can be run on the wearable computer system 30 to implement a shared view or display. The routine 118 includes a block 120 that collects and sends a video image to the host computer 14 via the transceiver 36. (Communications between the wearable computer system 30 and the host computer 14 are illustrated in FIG. 5 by dotted lines.) This image may be the entire multi-frame image produced by the video camera 38 or may be any one or more individual frames thereof. A block 122 within the routine 116 receives the video image and a block 124 displays the video image to the operator via a display device associated with the host computer 14. A block 126 enables the operator at the host computer 14 to choose a frame of the video image to be used as the basis for the shared view (a base image). The block 126 may, for example, simply display the most recently received frame of the received video signal and wait for the operator to indicate that a freeze of the image is requested. Alternatively, the block 126 may allow the operator to replay received frames to choose a desired image or may allow the operator to choose a base image in any other desired manner. If the operator does not choose a base image for the shared display, the block 126 provides control back to the block 122. If the operator chooses a base image at the block 126, a block 128 sends the selected base image to the wearable computer system 30 for display to the wearer on the HUD 40. The block 128 may also, if desired, display the selected base image to the operator via the display of the host computer 14.

Next, a block 130 within the routine 116 determines whether changes to the base image are being made or requested by the host computer operator. Such changes may include, for example, moving a cursor or a pointer, drawing on the image, highlighting areas of the image, posting information or other data on the image, or any other desired changes which enable the operator to communicate with the wearer using the image. These changes may be made by the operator using any desired operating system protocols and peripheral devices, such as a mouse and a keyboard. If changes to the image are made by the operator, a block 132 sends the changes to the wearable computer system 30 via the transceiver network 32/36. The changes may be communicated using any desired protocol and either the specific changes being made or an entire new image frame having the changes therein can be sent to the wearable computer system 30, as desired. In one embodiment, changes to the image in the form of pointer movements may be communicated as new pointer coordinates. After image changes have been made and sent to the wearable computer system 30, or if no new changes are made by the host operator, a block 134 refreshes the image of the host system (incorporating changes made by the operator as well as changes made by the wearable computer system and sent to the host system). Control of the routine 118 is then returned to the block 130 to detect other changes made by the host operator.

Meanwhile, the routine 118 includes a block 136 that displays the base image received from the host system on the HUD 40. A block 138 then detects changes to the image made by the wearer, which changes can be made using any available input device including the microphone 44 and the twiddler 46. If the wearer makes changes to the displayed image, a block 140 sends the changes to the host computer 14. Thereafter, or if no wearer initiated changes are detected, a block 142 refreshes the image on the HUD 40 incorporating changes made by the wearer as well as changes made by and received from the host computer 14. Control of the routine 118 is then returned to the block 138 for detection of further wearer initiated changes.

In this manner, the routines 116 and 118 operate on the host computer 14 and on the wearable computer system 30 to provide a shared view or scene that can be manipulated by one or both of the host operator and the wearer to enhance communications between the two. While the base image has been described herein as being derived from an image collected by the wearable computer system 30, this need not be the case. The base image could, instead, be a stored operator view, schematic, etc. related to the process or device of interest. In either case, the shared view enables the host operator to point out and talk about different elements within the displayed image in a manner that is easily viewable by the wearer. Furthermore, if desired, the wearer can make changes to the image using, for example, the same or a different cursor to aid conversations with the host operator. If desired, the wearer need not be able to make changes to the image, which simplifies the routines 116 and 118 of FIG. 5. Also, if desired, the wearer may select the base image to be used before it is sent to the host computer 14.

Another use of the wearable computer system 30 within a process control environment will be described in conjunction with the routine 150, illustrated in flow chart form in FIG. 6, which is preferably executed within the wearable computer system 30. Generally speaking, the routine 150 enables the wearer to check out and verify the proper connection of different devices or communication channels (such as I/O connections) within a process control environment in a hands-free manner and without the aid of an operator at a host device. Previously, verifying the proper connections of the devices or communication channels within a process control environment required a technician to go out into the field with a hand-held measurement device, such as a voltmeter, and a hand-held radio which the technician used to communicate with an operator at a host workstation. The technician first had to go to a device, indicate to the host operator via the hand-held radio that he or she was at the device and then indicate which communication channel he or she was going to check. At this point, the technician had to take a hand-held meter and actually measure the signal on the line. The technician then told the host operator, via the hand-held radio, what the measured signal was so that the host operator could verify whether the measured signal was the actual signal on the selected communication channel. Thereafter, the technician would tell the host operator to change the signal on the channel in question and the host operator would cause the signal or value of the communication channel to be changed. The technician would then measure the signal on the channel again to see if the change actually occurred. As is evident, this process required a lot of cumbersome communications between the host operator and a technician and was difficult to implement in a large and complex process control environment where the technician was trying to simultaneously manipulate a hand-held radio, a hand-held meter and obtain access to appropriate devices or communication lines. Furthermore, this process relied on communications between a host operator and the technician which tended to create confusion and to introduce errors based on miss-communications.

Figure 6:
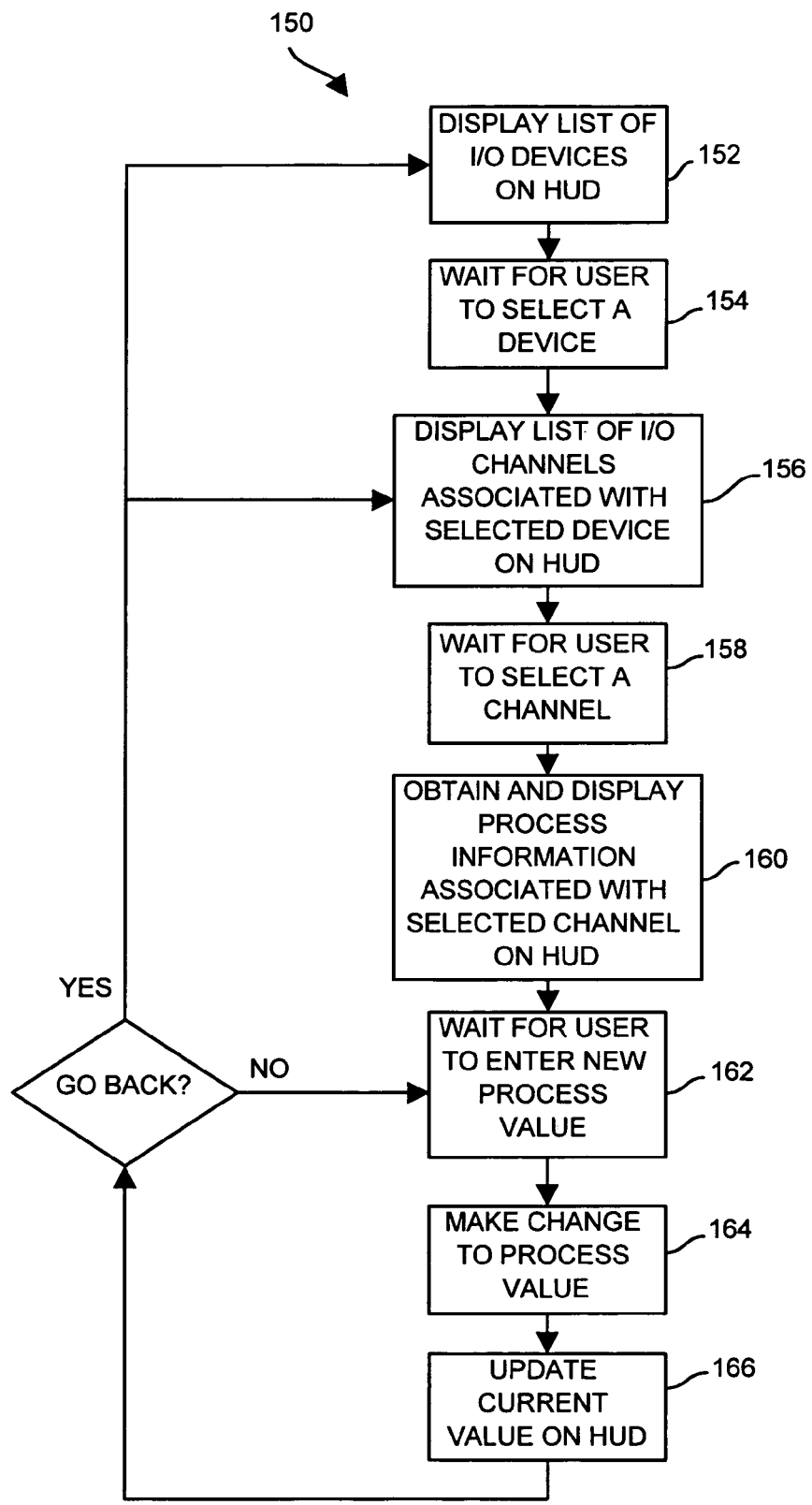
FIG. 6 is a flow chart diagram of a software routine that provides support to a wearable computer user who is verifying communication connections within a process control environment.

Using the routine 150 of FIG. 6, a wearer can check out device communication channel connections, such as I/O connections, within a process control system in a relatively hands-free manner (i.e., holding only a measurement device) and without the need to communicate with an operator located at a host workstation. Instead, the wearable computer system 30 communicates directly with the host computer to provide the wearer with all the information he or she needs and to make changes requested by the wearer necessary to check out the connections of a device or a communication channel within the process control system. Using the routine 150, the wearer can go out into the process control environment, obtain a list of devices and/or communication channels associated with a device, choose a particular device and/or communication channel for testing, find out what the signal on the device or channel being tested should be, make changes to the signal and measure both the original signal and the changed signal to test the proper connection of the device or channel, all without the need for a host operator.

The routine 150 includes a block 152 that displays a list of devices that may be tested on the HUD 40. The wearer may select a particular device to be tested by selecting one of the listed devices in any desired manner. Preferably, the wearer speaks commands into the microphone, such as UP, DOWN, LEFT, RIGHT, ENTER, etc. which are recognized and provided to the controller 54 and are used to move a cursor (which may be a highlighted area) or to select items displayed on a Windows screen on the HUD 40. Of course, the wearer may also select a device using the twiddler 46 or other keyboard device, by using the microphone to enter the name or tag associated with a device, or using the video camera 38 to automatically identify a device as described with respect to the routine 100 of FIG. 4.

Figure 7:
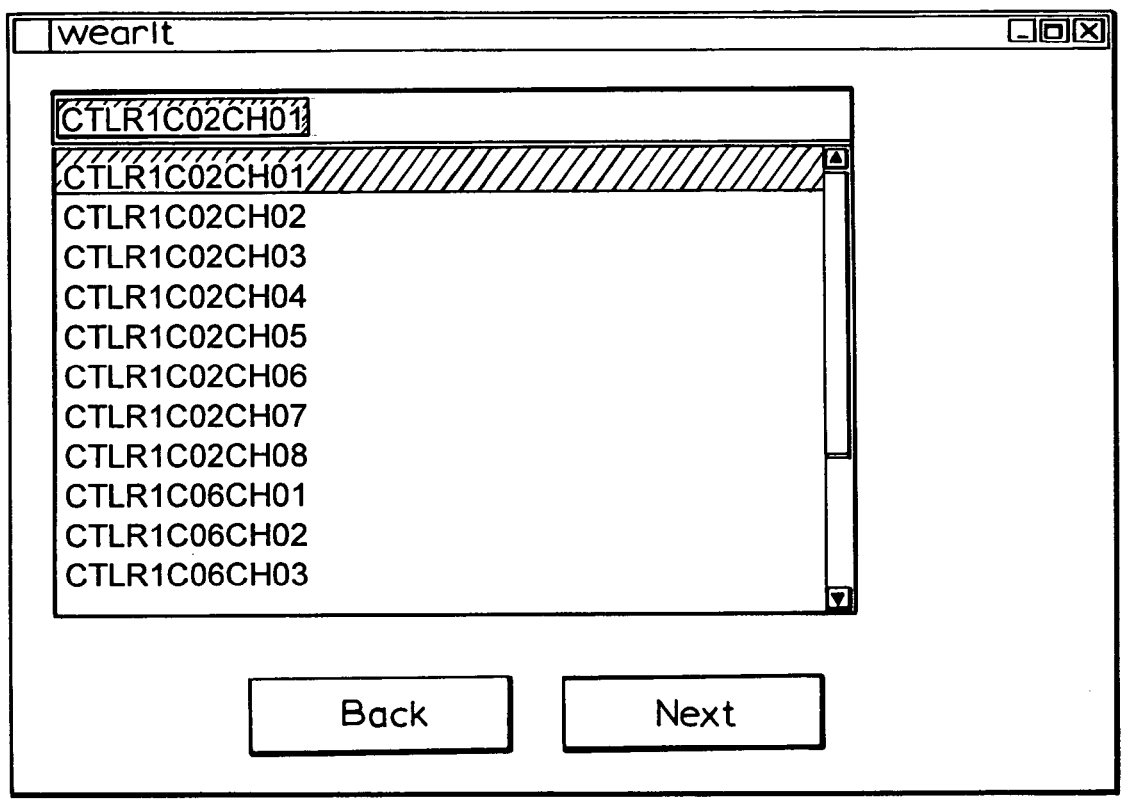
FIG. 7 is a first wearable computer screen display used in the software routine of FIG. 6.

A block 154 waits for the wearer to select a device and, after a device is selected or otherwise chosen by the wearer, a block 156 displays, via the HUD 40, a list of communication channels associated with the selected device. An example of such a display using a Windows-type display screen is illustrated in FIG. 7 and includes a set of 11 communication channels for the device CTLR1 (controller 1) with the first channel CTLR1CO2CHO1 being highlighted. Of course, the list of I/O or other communication channels may be displayed in any other manner and is not limited to that of FIG. 7.

Referring again to FIG. 6, a block 158 waits for the wearer to select a communication channel to be checked. The wearer may select a particular channel displayed in, for example, the screen of FIG. 7 using simple voice commands such as BACK and NEXT to move the cursor to a different channel and ENTER to select that channel. Thus, to select the third communication channel (CTLR1C02CH03) when viewing the display screen of FIG. 7, the wearer may simply say NEXT twice to highlight the channel CTLR1C02CH03 and then say ENTER to select that channel. While other voice commands can be used, it is preferable to limit the set of voice commands to simple words that can be recognized more easily by the voice recognition unit 56. Also, while the display screen of FIG. 7 may be manipulated using other input devices, such as the twiddler 46, it is preferable to enable the wearer to manipulate the screen and select or enter data on the screen using voice signals or using other hands-free input devices which allow the wearer to use both of his or her hands for other activities.

Figure 8:
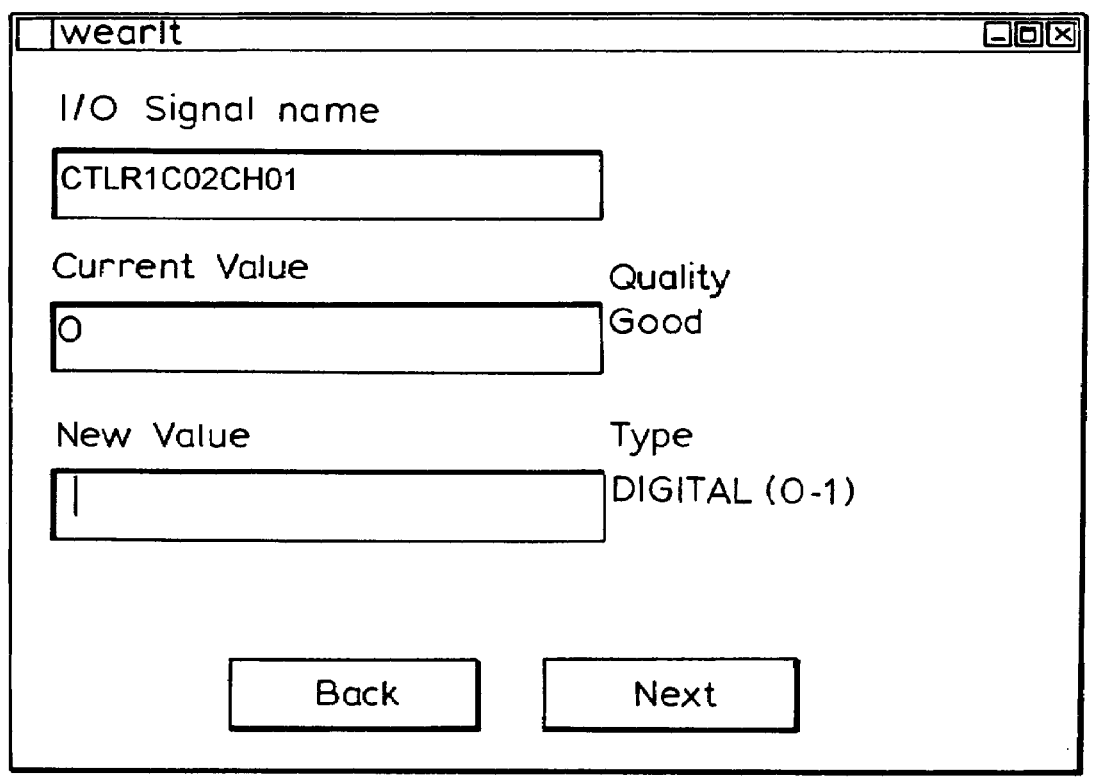
FIG. 8 is a second wearable computer screen display used in the software routine of FIG. 6.
Figure 9:
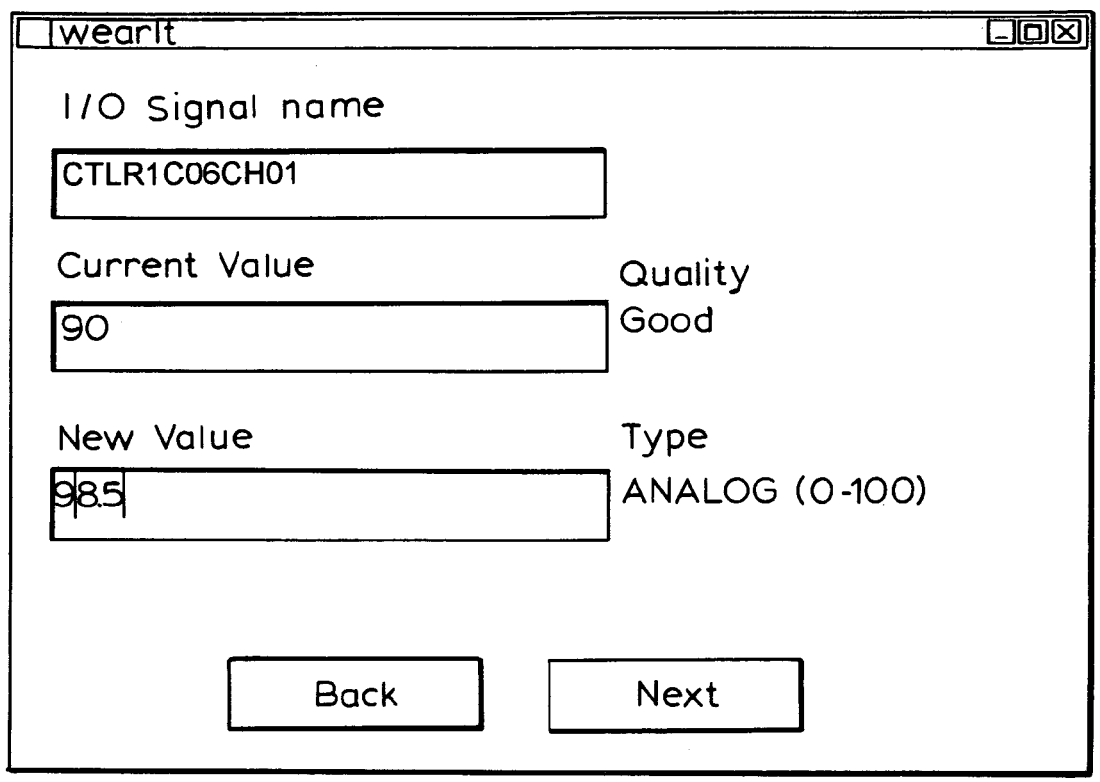
FIG. 9 is another wearable computer screen display used in the software routine of FIG. 6.

After a user has selected a particular communication channel to check, a block 160 displays a further screen on the HUD 40 which indicates process information corresponding to the selected channel. An example of such a screen is illustrated in FIG. 8 for the selected channel of CTLR1C02CH01. To create the screen of FIG. 8, the block 160 obtains the current process value of the selected communication channel from the host system via the transceiver 36 and displays the current value of that channel (in this case "0") along with an indication of the quality of the signal (in this case "good"). The block 160 also provides an area for the user to enter a new process value for the channel and indicates the type of signal on that channel, that is, whether the channel is an analog channel or a digital channel, and the valid ranges of that signal. The information displayed on the screen is either stored in the memory 52 of the wearable computer system 30 or is obtained from the host computer 14 which either stores that information in a memory or obtains the information from a device. In the illustrated example of FIG. 8, the channel CTLR1C02CH01 is a digital channel currently set to the value of zero. FIG. 9 illustrates a similar screen displayed on the HUD 40 for the channel CTLR1C06CH01 which is an analog channel having a valid range of 0–100 and which has a current value of 90.

When viewing the screen of FIG. 8 or 9, the user can manually measure the value on the selected channel using, for example, a hand-held voltmeter or any other device. If the measured value is the same as the value listed in the current value field of the screen, then the wearer can continue by entering a new value in the new value field. Referring again to FIG. 6, a block 162 waits for the wearer to enter a new process value, preferably using voice commands in the form of numbers and other simple commands such as ENTER, BACK and NEXT, so that the wearer does not have to remove his or her hands from the metering device. A new value of 98.5 is being entered into the new value field of the screen display of FIG. 9. Upon receiving a new value, a block 164 sends that new value to the host system which then changes the selected channel to the new value and, after verifying that the selected channel has been changed to the new value, sends the new value to the wearable computer system 30 as the current value of the selected channel. A block 166 then refreshes the screen display on the HUD 40 to indicate that the current value has been changed to the previously entered new value and clears the new value field to enable the wearer to enter a different new value. At this time, the wearer can measure the signal on the selected channel using the hand-held meter to see if the signal has changed to the entered new value. If so, then the communication channel is most likely correctly connected and operating within the process control system. If not, then a problem exists which must be identified and corrected. Of course, the wearer may make further changes to the communication channel value and measure those changes, or may scroll back to the channel or device selection screens to select a different channel or device to be checked.

Using the system described above, a single person may verify the proper connection and operation of different communication channels within a process control environment without needing to talk to and coordinate with an operator located at a host station and without needing to carry around a hand-held radio which gets in the way of the measurements and other activities being performed in the field.

In another embodiment, the wearable computer system 30 can be used to store and automatically retrieve information pertaining to any device or object within a process control environment, including devices that have device tags or other recognizable device features and objects such as walkways, trash cans, buildings, etc. that do not typically have device tags associated therewith. Using the wearable computer system 30 in this manner, a wearer can walk around a plant or other process control environment and record voice messages (or other information or data) pertaining to devices or objects within the plant for future retrieval either by that wearer or by another person. Likewise, upon seeing a device or other object, the wearer can determine (by looking at the display on the HUD 40) if any voice messages have been previously created for that device and can retrieve such previously created voice messages.

In one embodiment, a software routine for implementing this functionality (which may be stored in and executed by the processor or CPU 50 of the wearable computer 34) includes three basic routines, which may be separate routines or which may all be subparts of a single routine. The first routine identifies one or more devices within the field of view of the wearer or as being of interest to the wearer. This routine may, for example, accept voice inputs (from the microphone 44) in the form of device names, tags or other device identifiers to identify devices that are currently of interest to the wearer. Similarly, this routine may display a list of devices to the wearer via the HUD 40 and enable the wearer to select one of the displayed devices using, for example, voice commands or other inputs. Alternatively, this routine may automatically identify devices using the video image processing routine described above with respect to FIG. 4, which identifies one or more visible device features. Instead of using device features, the automatic video processing routine may identify a device based on identifiers placed on or near the device for the specific purpose of identifying the device (such as optical bar codes). On the other hand, transmitters may be placed on or near one or more devices and these transmitters may send out a signal which is received by the wearable computer 34 and decoded by the routine to identify the one or more devices. In one embodiment, a single transmitter may be used for a room or other unit area and, upon receiving and decoding the transmitted signal, the routine may access a memory (located, for example, in either the wearable computer 34 or the host computer 14) which stores all of the devices within that room or unit area. A list of these devices may then be provided to the wearer via the HUD 40. Similarly, devices that do not have tags or other automatically recognizable features may be tied (in a database) to devices that have such automatically recognizable features. Typically, devices in close proximity to one another will be tied together (associated with one another) in the database. Thereafter, whenever one of the devices having an automatically recognizable feature (a tagged device) is identified, the routine may consult the database to determine other non-tagged devices that are near to, or that are otherwise associated with the tagged device and display a list of all of these devices to the wearer via the HUD 40. Of course, other methods of identifying devices can be used as well.

When one or more devices have been identified and, for example, displayed to the wearer via the HUD 40, a second routine enables the wearer to store a voice message to be associated with one of the identified devices. The wearer may select one of the identified devices (using, for example, voice commands or any other type of input) and then, when prompted via the HUD 40, speak into the microphone 44 to create a voice message. The second routine then stores the voice message in a memory as being associated with the identified/selected device. This memory may be the memory 52 on the wearable computer 34 or, preferably, may be a memory somewhere within the host system such as in the host computer 14. When stored on the host computer 14, the voice message is available to more than one wearable computer.

A third routine determines if any previously stored voice messages exist for any of the devices identified by the first routine and, if so, displays in indication, such as an icon, on the HUD 40 to tell the wearer that a previously stored message exists for that identified device. When the wearer selects the icon using, for example, voice commands, the third routine retrieves the previously stored voice message from the memory and plays it to the wearer via the speaker 42.

Using this data storage/retrieval unit, whenever a wearer (or an operator of the host system 14) identifies a device, either manually or automatically, the wearer (or the operator) can record a voice message to be associated with that device and can, likewise, retrieve and hear previously stored voice messages associated with that device. In this manner, a wearer (or operator) may make notes or leave messages about a device or other object within the process control system which can later be retrieved by the same or a different person. Such a message may, for example, inform the next person that repair is ongoing on the device, or that calibration of the device needs to be performed, or may be any other desired message pertaining to the device or object. In one simple example, a wearer may walk down a walkway within the process control environment and notice that the walkway needs to be repainted or repaired. (The walkway may be identified automatically based on the room that the user is in, based on the proximity of the walkway to other devices that can be automatically identified using device features, based on specific codes or other features placed on the walkway to enable automatic identification, based on user generated input of any kind including voice input and hand operated device input, or in any other manner.) The wearer may select the walkway on the HUD 40 and then make a voice message indicating the repair to be made to the walkway. Thereafter, whenever the walkway is recognized as being of interest or as being viewed by a wearer of a wearable computer (or an operator at the host computer 14), the voice message is automatically made available to that wearer (or operator) and is indicated as being available by an icon (which may also be a text message) associated with that walkway on the HUD 40. In this manner, new information may be created and stored as associated with any device or object within a process control environment and this information may be later provided to a user in the same manner and/or at the same time that other, more standard information (such as help information) is made available to a user.

The routines described herein may, of course, be implemented in a standard multi-purpose CPU or on specifically designed hardware or firmware as desired. When implemented in software, the software may be stored in any computer readable memory such as on a magnetic disk, a laser disk, or other storage medium, in a RAM or ROM of a computer or processor, etc. Likewise, this software may be delivered to a user or a device (such as the wearable computer) via any known or desired delivery method including, for example, on a computer readable disk or other transportable computer storage mechanism or over a communication channel such as a telephone line, the internet, etc. (which is viewed as being the same as or interchangeable with providing such software via a transportable storage medium).

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A wearable computer for use in a process control environment having a process control system including a plurality of process control devices disposed within the process, the wearable computer comprising:
   a processing unit;
   a memory;
   an imaging device that produces an image signal;
   an image processor that processes the image signal to identify one of the devices based on a device feature identified by the image signal;
   a software routine stored in the memory which when executed on the processing unit provides process information generated by one or more of the plurality of process control devices during operation of the process;
   an input device adapted to produce an input signal;
   a remote communication device that communicates with the process control system; and
   a further software routine run on the processing unit that processes the input signal to develop a change signal indicating a change to be made in a process signal within the process control system and that communicates the change signal to the process control system via the remote communication device to thereby cause a change to be made to the process signal, where the process signal indicates a characteristic of the process during normal operation of the process.

2. The wearable computer of claim 1, further including a heads up display and a display unit coupled to the image processor that displays information pertaining to the identified device on the heads up display.

3. The wearable computer of claim 2, wherein the information is diagnostic information related to the identified device.

4. The wearable computer of claim 2, wherein the information is help information related to the identified device.

5. The wearable computer of claim 2, further including a remote communication device that communicates with the process control system and wherein the information is process information obtained from the identified device and sent to the wearable computer via the remote communication device.

6. The wearable computer of claim 1, wherein the imaging device is a video camera that produces a multi-frame image signal and wherein the image processor includes a frame grabber that grabs an image frame from the multi-frame image signal.

7. The wearable computer of claim 1, wherein the device feature includes an alpha-numeric character and wherein the image processor includes an optical character recognition routine that decodes the alpha-numeric character within the image signal to identify the device.

8. The wearable computer of claim 1, wherein the device feature is a device tag and wherein the image processor includes an optical character recognition routine that decodes the device tag within the image signal to identify the one of the multiple devices.

9. The wearable computer of claim 1, further including a microphone that produces a speech signal and a voice recognition unit coupled to the microphone that decodes the speech signal to produce a command signal.

10. The wearable computer of claim 1, further including a microphone that produces a speech signal and a memory that stores the speech signal as associated with the identified device.

11. The wearable computer of claim 1, further including a microphone that produces a speech signal and a remote communication device that sends the speech signal to a memory within the process control system for storage in and retrieval from a memory as associated with the identified device.

12. A device identification unit within a wearable computer having an input device that develops an input signal, a remote communication device that communicates with the process control system and an imaging device that produces an image signal, where the wearable computer is for use in a process control system including a plurality of process control devices disposed within a process, the device identification unit comprising:
   a processor;
   a memory; and
   a software routine stored in the memory and executed on the processor to process the image signal to identify a device based on a device feature identified by the image signal, to provide process information generated by one or more of the plurality of process control devices during operation of the process, and to process the input signal so as to develop a change signal indicating a change to be made in a process signal within the process control system and to communicate the change signal to the process control system via the remote communication device to thereby cause the change to be made to the process signal, where the process signal indicates a characteristic of the process during normal operation of the process.

13. The device identification unit of claim 12, wherein the wearable computer includes a heads up display and wherein the software routine displays information pertaining to the identified device on the heads up display.

14. The device identification unit of claim 13, wherein the wearable computer further includes a remote communication device that communicates with a process control system coupled to the identified device and wherein the information is process information obtained from the identified device and sent to the wearable computer via the remote communication device.

15. The device identification unit of claim 12, wherein the imaging device of the wearable computer is a video camera that produces a multi-frame image signal and further including a frame grabber that grabs one image frame from the multi-frame image signal as the image signal.

16. The device identification unit of claim 12, wherein the device feature includes an alpha-numeric character and further including an optical character recognition routine that decodes the alpha-numeric character within the image signal to identify the device.

17. The device identification unit of claim 12, wherein the device feature is a device tag and further including an optical character recognition routine that decodes the device tag within the image signal to identify the device.

18. The device identification unit of claim 12, wherein the wearable computer includes a microphone that produces a speech signal and further including a voice recognition unit coupled to the microphone that decodes the speech signal to produce a command.

19. A wearable computer system for use in testing a process control system including a plurality of process control devices disposed within a process and external to the wearable computer, the wearable computer comprising:
   a processing unit;
   a computer readable memory;
   an input device adapted to produce an input signal;
   a remote communication device that communicates with the process control system; and
   a software routine run on the processing unit that processes the input signal to develop a change signal indicating a change to be made in a process signal within the process control system and that communicates the change signal to the process control system via the remote communication device to thereby cause a change to be made to the process signal, where the process signal indicates a characteristic of the process during normal operation of the process.

20. The wearable computer of claim 19, further including a heads up display and wherein the software routine communicates with the process control system to obtain the actual value of the process signal and displays the actual value of the process signal via the heads up display.

21. The wearable computer of claim 19, further including a heads up display that displays an image and wherein the software routine produces a screen on the heads up display having a list of communication channels therein and enables the user to select one of the communication channels using the input device.

22. The wearable computer of claim 21, wherein the software routine displays the type of process signal on a selected communication channel via the heads up display.

23. The wearable computer of claim 21, wherein the software routine displays a valid range of the process signal on a selected communication channel via the heads up display.

24. The wearable computer of claim 21, wherein the software routine enables a user to enter the change signal for the process signal in a field on the heads up display.

25. A process control testing unit for use in a process control system including a plurality of process control devices disposed within the process and external to a wearable computer, where the process control testing unit communicates with the wearable computer having, an input device that develops an input signal, a remote communication device that communicates with the process control system and a heads up display, the process control testing unit comprising:
   a processor;
   a memory; and
   a software routine stored on the memory and executed on the processor of the wearable computer to process the input signal so as to develop a change signal indicating a change to be made in a process signal within the process control system and to communicate the change signal to the process control system via the remote communication device to thereby cause the change to be made to the process signal, where the process signal indicates a characteristic of the process during normal operation of the process.

26. The process control testing unit of claim 25, wherein the change signal indicates a change in a communication signal and causes the communication signal to be changed from a first value to a second value.

27. The process control testing unit of claim 25, wherein the software routine communicates with the process control system to obtain the actual value of the process signal and displays the actual value of the process signal via the heads up display.

28. The process control testing unit of claim 25, wherein the software routine displays a set of different process control signals for selection via the heads up display.

29. The process control testing unit of claim 25, wherein the software routine produces a screen on the heads up display having a list of communication channels therein and enables a user to select one of the communication channels using the input device.

30. The process control testing unit of claim 29, wherein the software routine displays the type of process signal on a selected communication channel via the heads up display.

31. The process control testing unit of claim 29, wherein the software routine displays a valid range of the process signal on a selected communication channel via the heads up display.

32. The process control testing unit of claim 29, wherein the software routine enables a user to enter the change signal for the process signal in a field on the heads up display.

33. An image viewing unit for use in a process control system including an operator workstation having an operator processing unit, an operator display and an operator remote communication device, and including a wearable computer having an input device that develops an input signal, a remote communication device that communicates with the process control system, an imaging device that produces a first image, a portable display, a wearable remote communication device and a wearable processing unit, and a plurality of process control devices disposed within a process and external to the wearable computer, the image viewing unit comprising:
 a first computer readable memory having a first software routine stored therein, said first software routine capable of being implemented on the operator processing unit to perform the functions of:
  receiving a second image from the wearable computer via the operator remote communication device, wherein the second image is derived from the first image;
  displaying the second image on the operator display;
  enabling an operator to make changes to the displayed second image to create a third image; and
  sending the third image to the wearable computer via the operator remote communication device; and
 a second computer readable memory having a second software routine stored therein, said second software routine capable of being implemented on the wearable processing unit to perform the functions of:
  identifying a device based on a device feature identified by the first image;
  creating the second image from the first image by making graphical changes to the first image;
  sending the second image to the operator workstation via the wearable remote communication device;
  receiving the third image from the operator workstation via the wearable remote communication device;
  displaying the third image on the portable display; and
  processing the input signal so as to develop a change signal indicating a change to be made in a process signal within the process control system and to communicate the change signal to the process control system via the remote communication device to thereby cause the change to be made to the process signal, where the process signal indicates a characteristic of the process during normal operation of the process.

34. The image viewing unit of claim 33, wherein the first software routine sends the third image to the wearable computer by sending a base image to the wearable computer at a first time and by sending changes to the base image to the wearable computer at a second and later time.

35. The image viewing unit of claim 34, wherein the first software routine allows an operator to choose the base image before sending the base image to the wearable computer.

36. The image viewing unit of claim 33, wherein the second software routine enables a user of the wearable computer to make changes to the third image and sends the changes to the third image to the operator workstation via the wearable remote communication device.

37. The image viewing unit of claim 33, wherein the second image is the first image.

38. A data storage/retrieval unit within a wearable computer for use in a process control system including a plurality of process control devices disposed within a process, the wearable computer having, a microphone that produces a voice signal, an input device that produces an input signal, a speaker and a heads up display, the data storage/retrieval unit comprising:
 a processor;
 a computer readable memory;
 a first software routine stored on the computer readable memory and executed on the processor of the wearable computer that identifies a process control device based on a device feature captured by the input signal;
 a second software routine stored on the computer readable memory and executed on the processor of the wearable computer that receives the voice signal from the microphone and stores the received voice signal as being linked to the identified process control device in a further memory associated with the wearable computer in response to a first user input to store the received voice signal;
 a third software routine stored on the computer readable memory and executed on the processor of the wearable computer that provides an indication via the heads up display that a previously stored voice signal is available for the identified process control device when the previously stored voice signal exists for the identified process control device in the further memory and that plays the previously stored voice signal for the identified process control device on the speaker in response to a second user input selecting the previously stored voice signal for the identified process control device for retrieval; and
 a fourth software routine stored on the computer readable memory and adapted to be executed on the processor of the wearable computer that provides process information generated by one or more of the plurality of process control devices during operation of the process.

39. The data storage/retrieval unit of claim 38, wherein the input signal is a video image and the first software routine includes an image processing routine that processes the video image to identify the process control device.

40. The data storage/retrieval unit of claim 39, wherein the image processing routine includes an optical character recognition routine that recognizes alpha-numeric characters within the video image and the image processing routine identifies the process control device based on the alpha-numeric characters.

41. The data storage/retrieval unit of claim 38, wherein the wearable computer includes a remote communication device that communicates with a process control system coupled to the identified process control device and the further memory is within the process control system, and further including a fourth software routine that communicates with the further memory via the remote communication device.

42. The data storage/retrieval unit of claim 38, wherein the third software routine displays an icon via the heads up display as the indication.

43. An image viewing system for use in a process control system including an operator workstation having an operator processing unit, an operator display and an operator remote communication device, and including a wearable computer having an input device that develops an input signal, a remote communication device that communicates with the process control system, an imaging device that produces a first image, a portable display, a wearable remote communication device and a wearable processing unit, and a plurality of process control devices disposed within a process and external to the wearable computer, the image viewing system comprising:
 a first computer readable memory having a first software routine stored therein, said first software routine capable of being implemented on the operator processing unit to perform the functions of:
  receiving a second image from the wearable computer via the operator remote communication device;
  displaying the second image on the operator display;
  enabling an operator to make changes to the displayed second image to create a third image; and
  sending the third image to the wearable computer via the operator remote communication device; and
 a second computer readable memory having a second software routine stored therein, said second software routine capable of being implemented on the wearable processing unit to perform the functions of:
  identifying a device based on a device feature identified by the first image;
  creating the second image from the first image by making graphical changes to the first image;
  sending the second image to the operator workstation via the wearable remote communication device;
  receiving the third image from the operator workstation via the wearable remote communication device;
  displaying the third image on the portable display; and
  processing the input signal so as to develop a change signal indicating a change to be made in a process signal within the process control system and to communicate the change signal to the process control system via the remote communication device to thereby cause the change to be made to the process signal, where the process signal indicates a characteristic of the process during normal operation of the process.

44. The image viewing system of claim 43, wherein the graphical changes to the first image include changes in the form of movements of a pointer on the portable display.

45. The image viewing system of claim 43, wherein the first software routine sends the third image to the wearable computer by sending a base image to the wearable computer at a first time and by sending changes to the base image to the wearable computer at a second and later time.

46. An image viewing system for use in a process control system including an operator workstation having an operator processing unit, an operator display and an operator remote communication device, and including a wearable computer having an input device that develops an input signal, a remote communication device that communicates with the process control system, an imaging device that produces a first image, a portable display, a wearable remote communication device and a wearable processing unit, and a plurality of process control devices disposed within a process and external to the wearable computer, the image viewing system comprising:
 a first computer readable memory having a first software routine stored therein, said first software routine capable of being implemented on the wearable processing unit to perform the functions of:
  identifying a device based on a device feature identified by the first image;
  receiving a second image from the operator workstation via the wearable remote communication device;
  displaying the second image on the portable display;
  enabling a wearable computer user to make changes to the displayed second image to create a third image; and
  sending the third image to the operator workstation via the wearable remote communication device; and
 a second computer readable memory having a second software routine stored therein, said second software routine capable of being implemented on the operator processing unit to perform the functions of:
  creating the second image from the first image by making graphical changes to the first image;
  sending the second image to the wearable computer via the operator remote communication device;
  receiving the third image from the wearable computer via the operator remote communication device;
  displaying the third image on the operator display; and
  processing the input signal so as to develop a change signal indicating a change to be made in a process signal within the process control system and to communicate the change signal to the process control system via the remote communication device to thereby cause the change to be made to the process signal, where the process signal indicates a characteristic of the process during normal operation of the process.

47. The image viewing system of claim 46, wherein the graphical changes to the first image include changes in the form of movements of a pointer on the operator display.

48. The image viewing system of claim 46, wherein the first software routine sends the third image to the operator workstation by sending a base image to the operator workstation at a first time and by sending changes to the base image to the operator workstation at a second and later time.

* * * * *

UNITED STATES PATENT AND TRADEMARK OFFICE
CERTIFICATE OF CORRECTION

PATENT NO.         : 7,230,582 B1                          Page 1 of 1
APPLICATION NO.    : 09/249597
DATED              : June 12, 2007
INVENTOR(S)        : Andrew P. Dove et al.

It is certified that error appears in the above-identified patent and that said Letters Patent is hereby corrected as shown below:

On The Title page Item -56-

<u>On Page 2:</u>

Other Publications, right Column, 7th reference, "Sep. 27, 20004" should be -- Sep 27, 2004 --.

At Column 8, line 24, "IDS" should be -- IDs --.

At Column 18, line 56, "having," should be -- having --.

At Column 20, line 31, "having," should be -- having --.

At Column 20, line 62, "and adapted to be executed" should be -- and executed --.

Signed and Sealed this

Sixth Day of May, 2008

JON W. DUDAS
*Director of the United States Patent and Trademark Office*